(12) United States Patent
Abe et al.

(10) Patent No.: US 10,050,871 B2
(45) Date of Patent: Aug. 14, 2018

(54) COMMUNICATION SYSTEM, ROUTE SELECTION APPARATUS, AND ROUTE SELECTION METHOD

(71) Applicant: NTT DOCOMO, INC., Tokyo (JP)

(72) Inventors: Motohiro Abe, Tokyo (JP); Shinichi Minamimoto, Tokyo (JP); Mana Kaneko, Tokyo (JP); Masataka Ikeda, Tokyo (JP); Hiromasa Yamaguchi, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 15/128,019

(22) PCT Filed: Aug. 26, 2015

(86) PCT No.: PCT/JP2015/074124
§ 371 (c)(1),
(2) Date: Sep. 21, 2016

(87) PCT Pub. No.: WO2016/031886
PCT Pub. Date: Mar. 3, 2016

(65) Prior Publication Data
US 2017/0111263 A1    Apr. 20, 2017

(30) Foreign Application Priority Data
Aug. 29, 2014  (JP) .................... 2014-175952

(51) Int. Cl.
*H04L 12/66*  (2006.01)
*H04L 12/707*  (2013.01)
(Continued)

(52) U.S. Cl.
CPC .............. *H04L 45/24* (2013.01); *H04L 47/14* (2013.01); *H04L 61/6068* (2013.01); *H04W 88/06* (2013.01)

(58) Field of Classification Search
CPC combination set(s) only.
See application file for complete search history.

(56) References Cited

U.S. PATENT DOCUMENTS 5,999,525 A * 12/1999 Krishnaswamy ... H04L 12/1818
370/352
6,069,890 A * 5/2000 White ................. H04M 3/4228
370/352

(Continued)

FOREIGN PATENT DOCUMENTS

JP    2003-324486 A    11/2003
JP    2010-147690 A    7/2010
(Continued)

OTHER PUBLICATIONS

International Search Report issued in PCT/JP2015/074124, dated Nov. 24, 2015 (2 pages).
(Continued)

*Primary Examiner* — Frank Duong
(74) *Attorney, Agent, or Firm* — Osha Liang LLP

(57) ABSTRACT

A communication system in which a plurality of communication networks are interconnected, the communication system including a plurality of inter-communication network connections that include an inter-communication network connection by a first circuit performing communication by a first protocol and an inter-communication network connection by a second circuit performing communication by a second protocol, including: a route selection apparatus that is provided in a communication network that is connected to another communication network by the first circuit, and that is connected to another communication network by the second circuit; and an address resolution apparatus that can communicate with the route selection apparatus, wherein the route selection apparatus sends an inquiry to the address resolution apparatus about an address corresponding to an
(Continued)

incoming number in a connection request signal transmitted from a user apparatus in the communication network so as to determine whether to transmit the connection request signal to a communication network of an incoming destination via the first circuit or to transmit the connection request signal to a communication network of an incoming destination via the second circuit based on a response received from the address resolution apparatus.

16 Claims, 13 Drawing Sheets

(51) Int. Cl.
*H04L 12/801* (2013.01)
*H04L 29/12* (2006.01)
*H04W 88/06* (2009.01)

(56) References Cited

U.S. PATENT DOCUMENTS

| | | | | |
|---|---|---|---|---|
| 6,324,280 B2* | 11/2001 | Dunn | ............... | H04L 12/6418 370/352 |
| 6,463,053 B1* | 10/2002 | Chen | ............... | H04Q 3/0029 370/352 |
| 6,584,094 B2* | 6/2003 | Maroulis | ............ | H04M 7/0057 370/352 |
| 6,697,357 B2* | 2/2004 | Emerson, III | ...... | H04L 12/6418 370/352 |
| 6,738,633 B2* | 5/2004 | Kim | ............... | H04Q 3/005 379/221.14 |
| 6,781,983 B1* | 8/2004 | Armistead | ......... | H04L 12/5692 370/352 |
| 6,807,150 B1* | 10/2004 | McNiff | ............... | H04L 12/66 370/230 |
| 7,920,690 B2* | 4/2011 | Sylvain | ............. | H04L 12/6402 379/219 |
| 7,957,366 B2* | 6/2011 | Kaizawa | ............ | H04M 1/2535 370/352 |
| 7,957,367 B2* | 6/2011 | Kobayashi | ......... | H04L 29/1216 370/352 |
| 8,254,278 B2* | 8/2012 | Sterman | ............ | H04L 12/66 370/252 |
| 9,201,743 B2 | 12/2015 | Brunel et al. | | |
| 9,241,258 B2* | 1/2016 | Ku | ............... | H04W 8/26 |
| 2003/0007482 A1* | 1/2003 | Khello | ............. | H04L 29/1216 370/352 |
| 2005/0025294 A1* | 2/2005 | Matsuhashi | ......... | H04M 1/2535 379/88.17 |
| 2007/0258575 A1* | 11/2007 | Douglas | ............ | H04L 29/1216 379/221.13 |

FOREIGN PATENT DOCUMENTS

JP 2012-253575 A 12/2012
JP 2014-511072 A 5/2014

OTHER PUBLICATIONS

Written Opinion of the International Searching Authority issued in PCT/JP2015/074124, dated Nov. 24, 2015 (4 pages).

3GPP TS 23.228 V12.5.0; "3rd Generation Partnership Project; Technical Specification Group Services and System Aspects; IP Multimedia Subsystem (IMS); Stage 2 (Release 12)"; Jun. 2014 (310 pages).

GSM Association; Official Document IR.67 "DNS/ENUM Guidelines for Service Providers & GRX/IPX Providers"; 4.1; Mar. 3, 2010 (76 pages).

* cited by examiner

COMMUNICATION SYSTEM, ROUTE SELECTION APPARATUS, AND ROUTE SELECTION METHOD

TECHNICAL FIELD

The present invention relates to a technique of interconnection between communication networks.

BACKGROUND ART

There has been a conventional technique for performing international connection by interconnecting mobile communication networks between different countries. FIG. 1 shows an example of an interconnection configuration between mobile communication networks via an international relay network. In the example of FIG. 1, each of an operator B network and an operator C network which are networks of operators (communication carriers) of a country (example: Japan) is connected to an international relay network, and also, an operator A network which is an operator network of another country (example: united states of America) is connected to the international relay network, so that international interconnection is performed.

The international relay network shown in FIG. 1 is an existing relay network based on the common channel signaling system, and the international relay network is connected to each operator network by a digital circuit (STM circuit).

An example of a call connection procedure via the international relay network is described with reference to FIG. 1. In this example, it is assumed that call connection is performed from a user A (UE-A (user apparatus-A)) of the operator A to a user B (UE-B). Also, it is assumed that the user B was originally a subscriber of the operator C, then, becomes a subscriber of the operator B by MNP (Mobile Number Portability). That is, the telephone number of the user B is a number managed in the operator C.

When the user A performs operation for originating a call to a user B incoming number at the UE-A, a connection request signal including the user B incoming number as a destination is transmitted (step 1). In the operator A network, the call origination is determined as a call origination to abroad, so that the connection request signal is transmitted to the international relay network. In the international relay network, since the user B incoming number is identified as a number of the operator C, the connection request signal is routed to the operator C network (step 2). In the operator C network, since the user B incoming number is identified as a number which is MNP-moved out to the operator B, the connection request signal is transferred to the operator B network, so that an incoming call arrives at the user B (UE-B) (step 3).

RELATED ART DOCUMENT

Non Patent Document

[NON PATENT DOCUMENT 1] 3GPP TS 23.228 V12.5.0 (2014-06)
[NON PATENT DOCUMENT 2] GSMA PRD IR.67

SUMMARY OF THE INVENTION

Problem to be Solved by the Invention

In the future, it can be considered that IP interconnection (international IP interconnection) will be developing in international interconnection between mobile communication networks. In the international IP interconnection, a network configuration is adopted in which the international relay network shown in FIG. 1 is replaced with an IPX network which is an IP relay network. However, in the process in which the IP interconnection is developing, it is assumed that interconnection via the international relay network (STM circuit) and IP interconnection via the IPX network (IP circuit) coexist.

In a case where all operator networks are interconnected by the IP circuits, or in a case where all operator networks are interconnected by the STM circuits, connection operation and the like can be performed in accordance with technical requirements and rules described in the non-patent document 1, non-patent document 2 and the like. However, currently, there is no rule in the case where the IP connection and the STM connection coexist. Thus, even when the IP connection and the STM connection coexist, connection operation is performed according to existing rules and the like. An example of a problem which arises from such a situation is described with reference to FIG. 2 and FIG. 3.

FIG. 2 is a diagram for explaining a connection configuration example and a problem in international interconnection when the IP connection and the STM connection coexist.

In the example shown in FIG. 2, the operator B network and the operator A network are interconnected by IP circuits via the IPX network, and the operator C network and the operator A network are interconnected by STM circuits via the international relay network.

In such a network configuration, like the case of FIG. 1, a procedure is described for performing call connection from the user A (UE-A) of the operator A to the user B (UE-B).

Like the case of FIG. 1, it is assumed that the user B was originally a subscriber of the operator C, but becomes a subscriber of the operator B by MNP.

When the user A performs operation for call origination to the user B incoming number, a connection request signal including the user B incoming number as a destination is transmitted to the international relay network (step 11). In the international relay network, since the user B incoming number is identified as a number of the operator C, the connection request signal is routed to the operator C network (step 12). In the operator C network, since the user B incoming number is recognized as a number which is moved out to the operator B by MNP, the connection request signal is transferred to the operator B network, so that an incoming call arrives at the user B (UE-B) (step 13). After that, voice commination and the like is performed via the international relay network.

If the user B is not a user who moved in from the operator C by MNP, but is a user who originally subscribes to the operator B and has a number managed by the operator B, call connection from the user A (UE-A) to the user B (UE-B) becomes a connection via the IPX network since the operator B network and the operator A network are interconnected via the IPX network by IP, so that voice communication and the like is also performed via the IPX network.

By the way, currently, in services provided by an operator, there is a service (to be referred to as IP based service hereinafter) that can be provided in the IP network, but that cannot be provided via the STM circuit. For example, the service is a video call service, a wide band service utilizing IP band control, or the like. In the present specification, there is a case where a communication circuit, such as the STM circuit, that is not an IP circuit is referred to as a digital circuit.

In the example of the network configuration shown in FIG. 2, it is assumed that the operator A and the operator B provide an IP based service. A user B who moved in the operator B from the operator C by MNP is a subscriber of the operator B. Thus, normally, the user B should be able to use the IP based service in the communication between the operator A and the operator B. However, as described with reference to FIG. 2, since the communication between the user B and the user A is performed via the STM circuit, the IP based service cannot be provided. On the other hand, if the user B is a user who is originally a user subscribing to the operator B, since the STM circuit is not used, the IP based service can be provided. Accordingly, when IP connection and STM connection coexist, there is a problem in that a case may occur where even an operator that can provide the IP based service cannot provide an IP based service to a user.

By the way, in a case shown in FIG. 2, it can be considered to transmit a connection request signal, addressed to the user B who moved in the operator B from the operator C by MNP, to the IPX network from the operator A network. However, address resolution of the user B incoming number cannot be performed in the IPX network and the like, so that the connection request signal is transferred to the international relay network. Thus, a problem similar to that described above arises.

Next, an example of another problem is described with reference to FIG. 3. FIG. 3 also shows a configuration example of international interconnection in which IP connection and STM connection coexist.

In the example of FIG. 3, a case is described where the user A (UE-A) connects to a user C (UE-C) which is a user of the operator C. In this example, it is assumed that the user C was a subscriber of the operator B originally, and moved in the operator C by MNP. That is, the number of the user C is a number that is issued from the operator B and that is managed in the operator B. Also, as described before, although the operator A network and the operator B network are IP-interconnected, the operator A network and the operator C network are not IP-interconnected, but are STM-connected.

When the user A performs operation for originating a call to the user C incoming number, a connection request signal including the user C incoming number as a destination is transmitted (step 21). In the operator A network, since the user C incoming number is identified as a number of the operator B network that is IP-connected to the operator A network, the connection request signal is transferred to the operator B network via the IPX network (step 22). In the operator B network, since the user C incoming number is identified as a number that has moved out to the operator C by MNP, the connection request signal is transferred to the operator C network (step 23), so that an incoming call arrives at the user C (UE-C).

That is, in the case of FIG. 3, although the operator C network and the operator A network are not IP-interconnected, it becomes possible to IP-interconnect between the operator C network and the operator A network via the operator B network. Therefore, an IP based service, which cannot be provided via the STM connection, can be provided to the user C.

As mentioned above, there is a problem in that IP interconnection becomes available between operator networks that are not IP-interconnected by using an operator network that provides IP interconnection as a relay network.

By the way, although the above-mentioned problems are examples in a case where IP connection and STM connection coexist, there may be similar problems even when the protocol of connecting circuits is a protocol other than IP and STM.

The present invention is contrived in view of the above-mentioned points, and an object of the present invention is to provide, in a communication system in which a plurality of communication networks are interconnected, a technique to enable proper communication connection between user apparatuses even when there are a plurality of inter-communication network connections including an inter-communication network connection by a first circuit that performs communication by a first protocol and an inter-communication network connection by a second circuit that performs communication by a second protocol.

Means for Solving the Problem

According an embodiment of the present invention, there is provided a communication system in which a plurality of communication networks are interconnected, the communication system including a plurality of inter-communication network connections that include an inter-communication network connection by a first circuit performing communication by a first protocol and an inter-communication network connection by a second circuit performing communication by a second protocol, including:

a route selection apparatus that is provided in a communication network that is connected to another communication network by the first circuit, and that is connected to another communication network by the second circuit; and an address resolution apparatus that can communicate with the route selection apparatus, wherein the route selection apparatus sends an inquiry to the address resolution apparatus about an address corresponding to an incoming number in a connection request signal transmitted from a user apparatus in the communication network so as to determine whether to transmit the connection request signal to a communication network of an incoming destination via the first circuit or to transmit the connection request signal to a communication network of an incoming destination via the second circuit based on a response received from the address resolution apparatus.

Also, according an embodiment of the present invention, there is provided a route selection apparatus in a communication system in which a plurality of communication networks are interconnected, the communication system including a plurality of inter-communication network connections that include an inter-communication network connection by a first circuit performing communication by a first protocol and an inter-communication network connection by a second circuit performing communication by a second protocol, the route selection apparatus being provided in a communication network that is connected to another communication network by the first circuit, and that is connected to another communication network by the second circuit, the route selection apparatus including:

means configured to send an inquiry, to an address resolution apparatus that can communicate with the route selection apparatus, about an address corresponding to an incoming number in a connection request signal transmitted from a user apparatus in the communication network; and determination means configured to determine whether to transmit the connection request signal to a communication network of an incoming destination via the first circuit or to transmit the connection request signal to a communication network of an incoming destination via the second circuit based on a response received from the address resolution apparatus.

Also, according an embodiment of the present invention, there is provided a route selection method executed by a route selection apparatus in a communication system in which a plurality of communication networks are interconnected, the communication system including a plurality of inter-communication network connections that include an inter-communication network connection by a first circuit performing communication by a first protocol and an inter-communication network connection by a second circuit performing communication by a second protocol, the route selection apparatus being provided in a communication network that is connected to another communication network by the first circuit, and that is connected to another communication network by the second circuit, the route selection method including:

a step of sending an inquiry, to an address resolution apparatus that can communicate with the route selection apparatus, about an address corresponding to an incoming number in a connection request signal transmitted from a user apparatus in the communication network; and a determination step of determining whether to transmit the connection request signal to a communication network of an incoming destination via the first circuit or to transmit the connection request signal to a communication network of an incoming destination via the second circuit based on a response received from the address resolution apparatus.

Effect of the Present Invention

According to an embodiment of the present invention, there is provided, in a communication system in which a plurality of communication networks are interconnected, a technique to enable proper communication connection between user apparatuses even when there are a plurality of inter-communication network connections including an inter-communication network connection by a first circuit that performs communication by a first protocol and an inter-communication network connection by a second circuit that performs communication by a second protocol.

EMBODIMENTS FOR CARRYING OUT THE INVENTION

In the following, embodiments of the present invention are described with reference to figures. The embodiments described below are merely examples, and the embodiments to which the present invention is applied are not limited to the embodiments below. For example, although the network of each operator described below is a mobile communication network, the present invention can be applied not limited to the case where the network of the operator is a mobile communication network. Also, although circuits used for inter-communication network connection described below are an IP circuit and an STM circuit, these are merely examples, and the present invention can be applied not limited to the case where protocols of circuits used for inter-communication network connection are IP and STM.

First Embodiment

<System Configuration>

Figure 1:
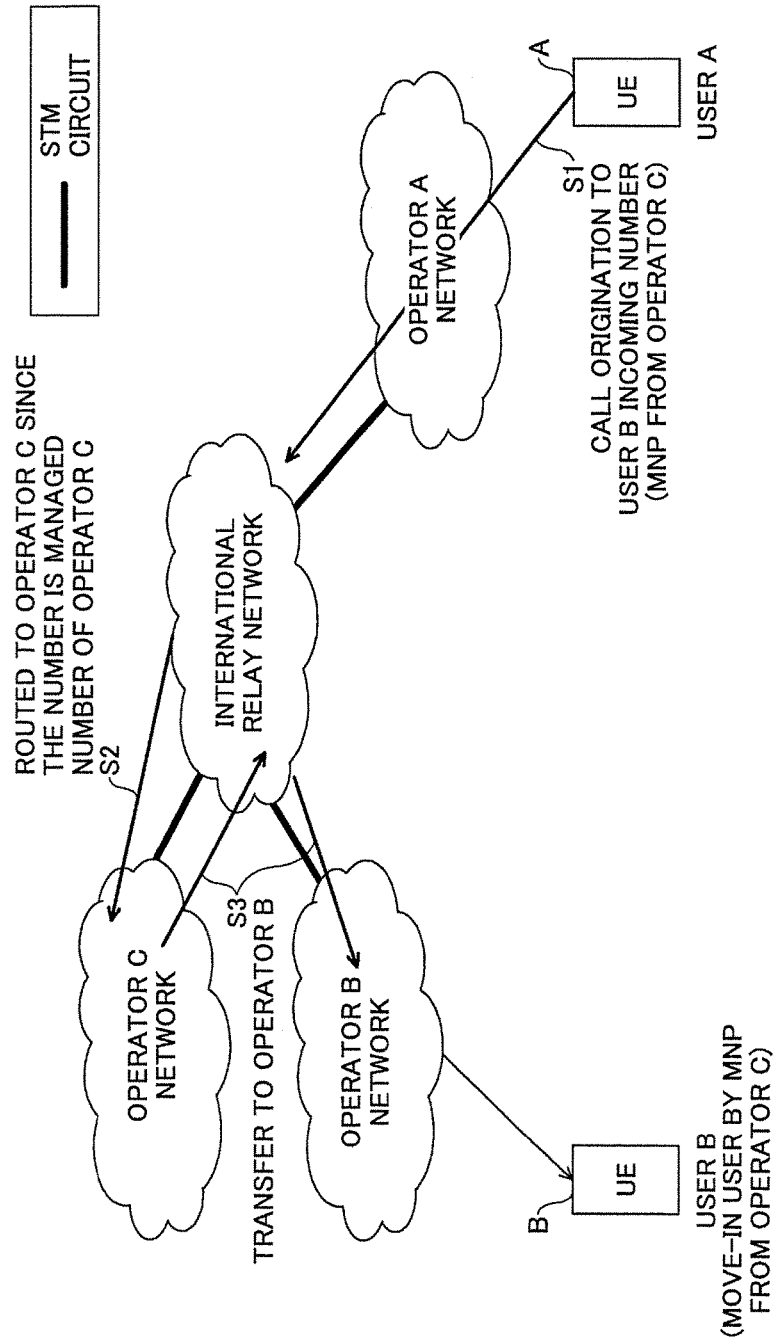
FIG. 1 is a diagram showing a conventional international interconnection network, and a connection procedure example.
Figure 2:
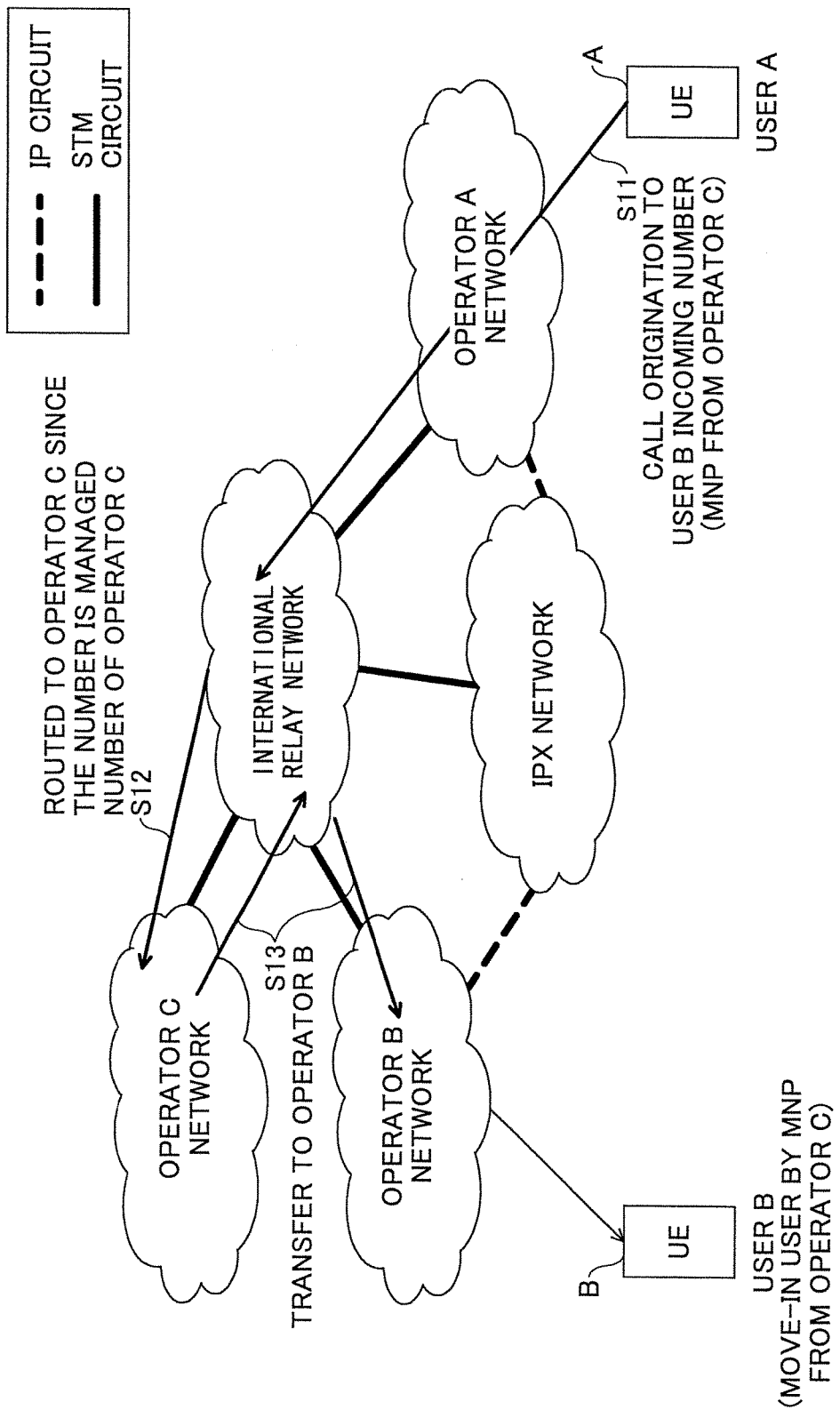
FIG. 2 is a diagram for explaining a connection configuration example and a problem in an international interconnection in a case where IP connection and STM connection coexist.
Figure 3:
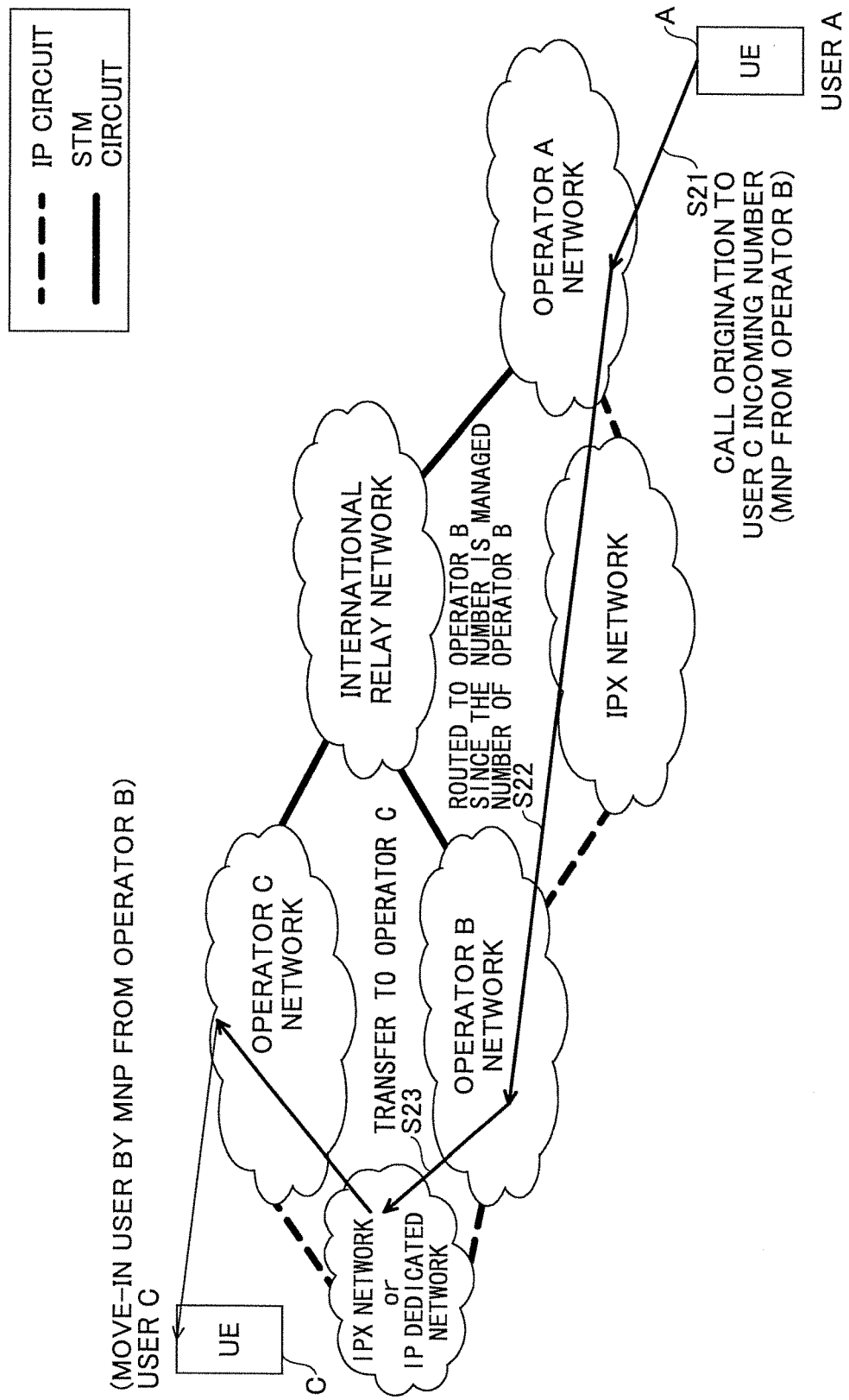
FIG. 3 is a diagram for explaining a connection configuration example and a problem in an international interconnection in a case where IP connection and STM connection coexist.
Figure 4:
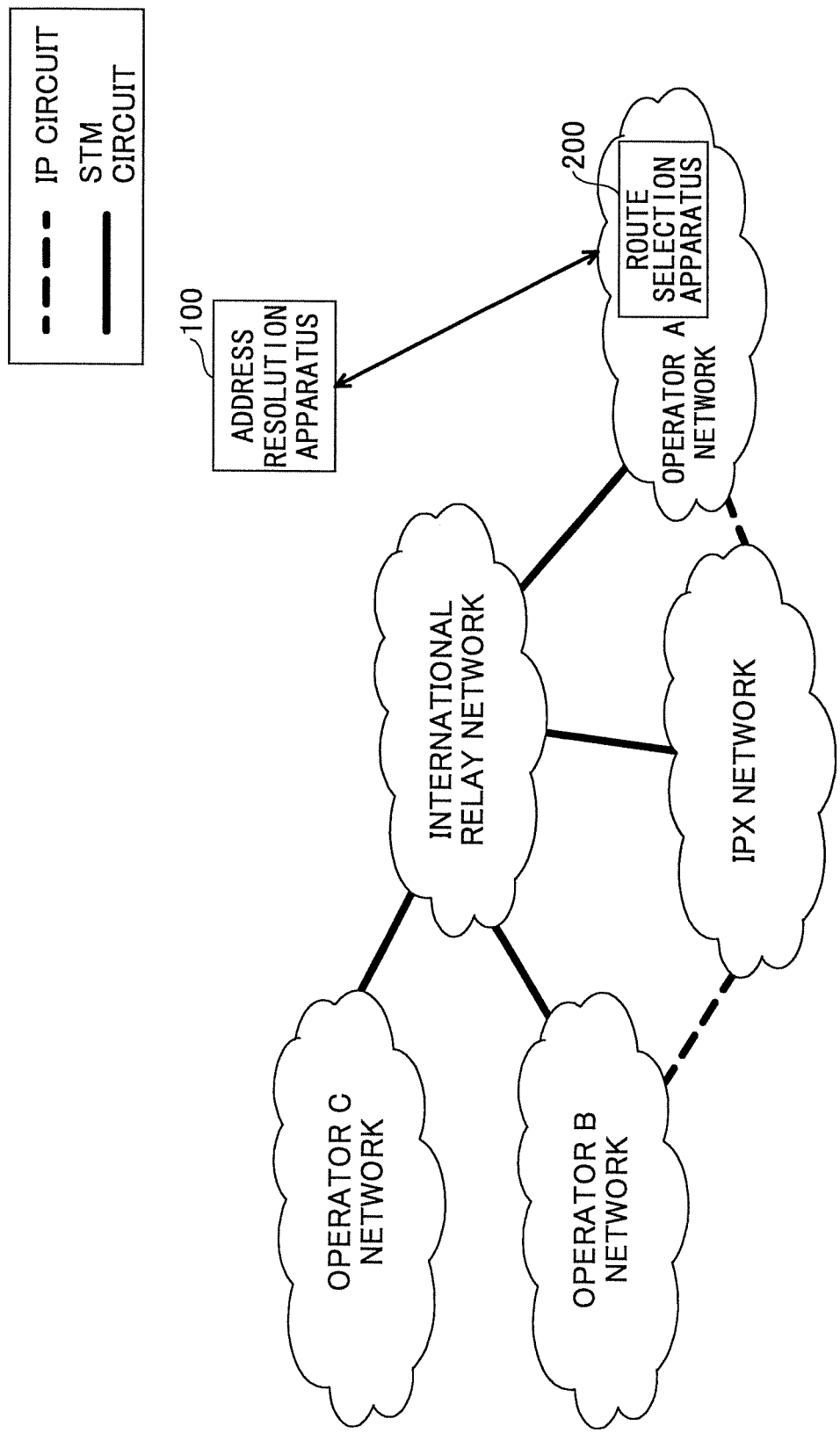
FIG. 4 is a diagram showing a network configuration example in a first embodiment.

First, a first embodiment of the present invention is described. FIG. 4 is a diagram for explaining a network configuration (system configuration) example of international interconnection in the first embodiment. The network configuration shown here is the same as that shown in FIG. 2 as a connection configuration between operator networks. That is, the operator B network and the operator A network are interconnected by IP circuits via the IPX network, and the operator C network and the operator A network are interconnected by STM circuits via the international relay network.

The network of each operator is provided with a route selection apparatus that is configured to direct a connection request signal and the like to a proper route. FIG. 4 especially shows a route selection apparatus 200 provided in the operator A network. Also, in the present embodiment, an address resolution apparatus 100 is provided for obtaining an IP address from a telephone number of a user in an operator that is IP-interconnected. The address resolution apparatus 100 is an ENUM server, for example, but is not limited to this. Also, the address resolution apparatus 100 may be provided anywhere as long as it can communicate with the route selection apparatus 200. For example, the function of the address resolution apparatus 100 may be provided in the IPX network.

The address obtained by the address resolution apparatus 100 is not limited to an IP address. It may be a name and the like. So, as a collective term, information obtained by the address resolution apparatus 100 is referred to as "address" hereinafter.

As described later in more detail, in the present embodiment, when the route selection apparatus 200 receives a connection request signal (example: INVITE request) including an incoming number as a destination from a user (UE) of the operator A, the route selection apparatus 200 sends an inquiry about an address corresponding to the incoming number to the address resolution apparatus 100. When the address corresponding to the incoming number is obtained, the route selection apparatus 200 transfers the connection request signal toward an operator network (operator network that is IP-interconnected) corresponding to the address. On the other hand, when the address corresponding to the incoming number is not obtained, the connection request signal is transferred to the international relay network side.

Figure 5:
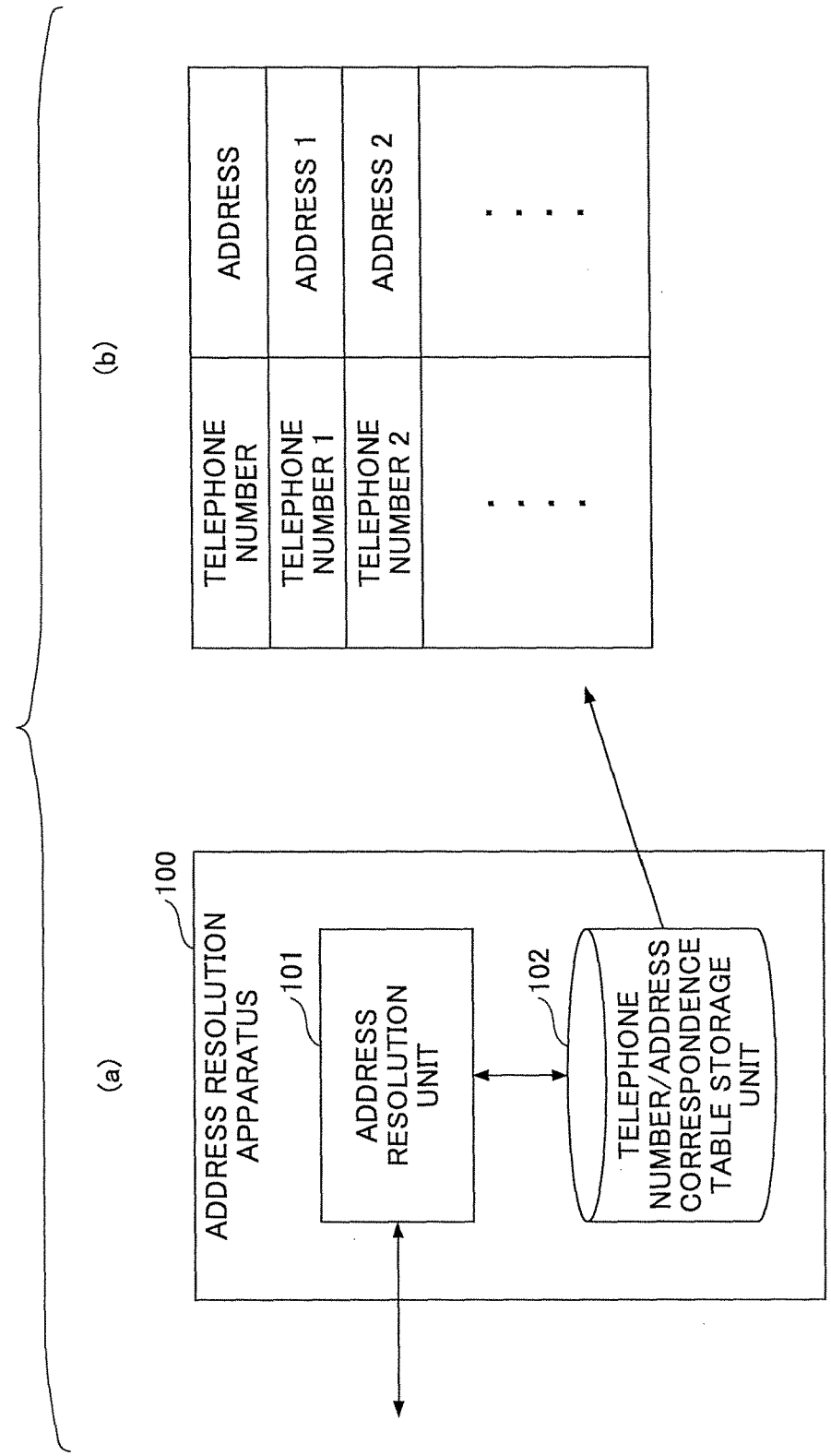
FIG. 5 is a functional block diagram of an address resolution apparatus 100.

FIG. 5 shows a functional block diagram of the address resolution apparatus 100 in the present embodiment. As shown in FIG. 5 (*a*), the address resolution apparatus 100 includes an address resolution unit 101, and a telephone number/address correspondence table storage unit 102.

FIG. 5 only shows functional units especially related to the embodiment of the present invention in the address resolution apparatus 100, and also includes functions that is not shown in the figure for performing actual operations. Also, the functional configuration shown in FIG. 5 is merely an example. Any functional partitions and any names of functional units may be adopted as long as operation of the present embodiment can be executed.

As shown in FIG. 5 (*b*), the telephone number/address correspondence table storage unit 102 stores a correspondence table in which telephone numbers are associated with addresses.

In the present embodiment, the telephone number set in the correspondence table is, for example, a telephone number of a user (UE) accommodated (contracted) by an operator network that is IP-interconnected with the operator A network, for example.

For example, in a case where the operator A network and the operator B network are IP-interconnected, the correspondence table does not store a telephone number of a user who moved out from the operator B by MNP and has become a user of the operator C that is not IP-interconnected with the operator A network. By the way, it is possible to store the telephone number as a telephone number of the operator C that is not IP-interconnected with the operator A network. However, in this case, there is no address corresponding to the telephone number (or, information indicating that the address does not exist is stored).

On the other hand, in a case where the operator A network and the operator B network are IP-interconnected, and the operator A network and the operator C network are not IP-interconnected, the correspondence table stores a telephone number and a corresponding address (address of operator B network) of a user who moved into the operator B from the operator C by MNP.

Although the above-mentioned example is information necessary when a call is originated from the operator A network, similar correspondence table may be stored for each operator network. However, for example, in a case where the address resolution apparatus 100 is provided as an apparatus accessed only by the operator A, only information necessary for the operator A may be stored.

Also, "address" stored in the correspondence table may be any address that can identify an operator network of a transfer destination to which the connection request signal is transferred. The address is not necessarily an address of the UE of the incoming destination. Of course, it may be an address of the UE of the incoming destination.

When the address resolution unit 101 receives an inquiry signal (example: ENUM Query) designating an incoming number from the route selection apparatus 200, the address resolution unit 101 searches the correspondence table in the telephone number/address correspondence table storage unit 102. When an address corresponding to the incoming number is found, the address resolution unit 100 returns the address to the route selection apparatus 200, when an address corresponding to the incoming number is not found, the address resolution unit 100 returns information indicating that the address does not exist in the correspondence table to the route selection apparatus 200. The "information indicating that the address does not exist in the correspondence table" may be an instruction indicating that connection should not be performed via the IPX network.

The address resolution apparatus 100 may be realized by one computer (server), or may be configured, by a plurality of computers, so as to be able to perform hierarchical search by hierarchically structuring the telephone numbers.

Figure 6:
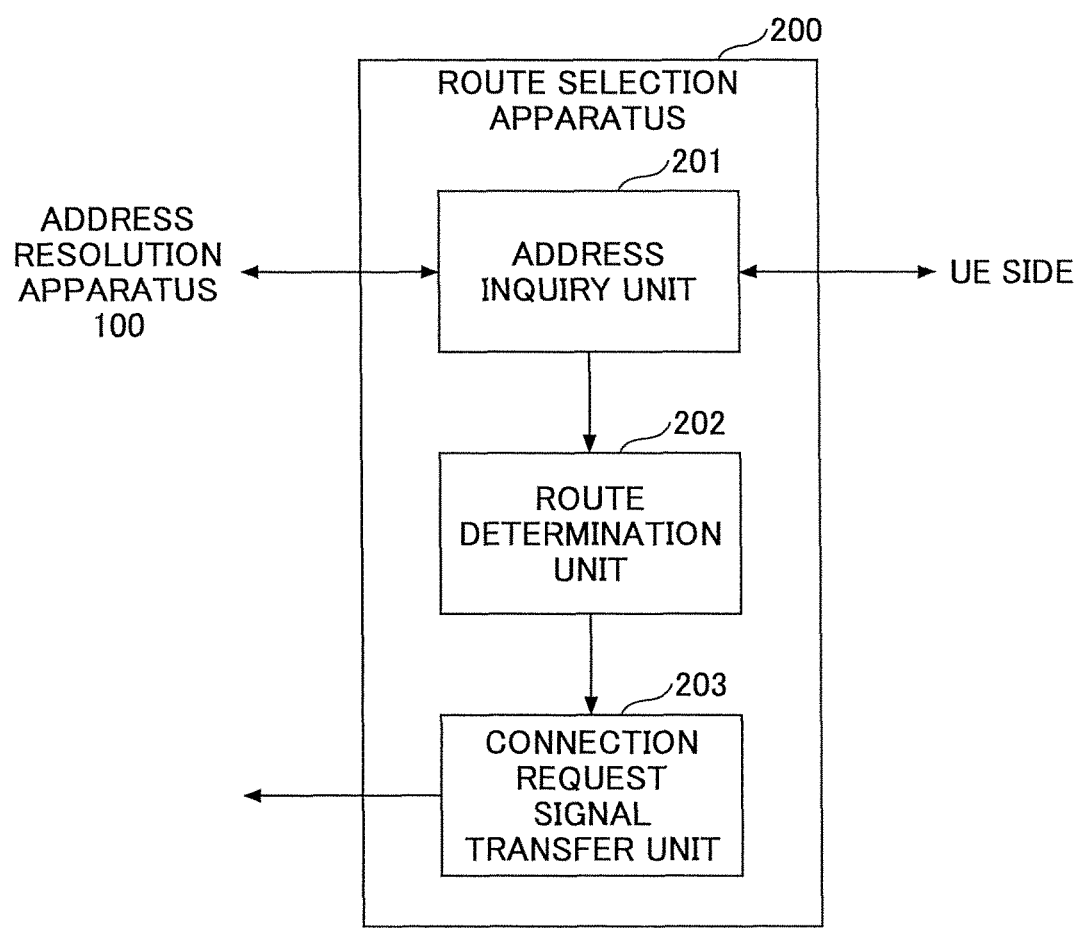
FIG. 6 is a functional block diagram of a route selection apparatus 200.

FIG. 6 shows a functional block diagram of the route selection apparatus 200. As shown in FIG. 6, the route selection apparatus 200 includes an address inquiry unit 201, a route determination unit 202, and a connection request signal transfer unit 203.

FIG. 6 only shows functional units especially related to the embodiment of the present invention in the route selection apparatus 200, and also includes functions that is not shown in the figure for performing actual operations. Also, the functional configuration shown in FIG. 6 is merely an example. Any functional partitions and any names of functional units may be adopted as long as operation of the present embodiment can be executed. The address inquiry unit 201 receives a connection request signal transmitted from a user (UE), transmits, to the address resolution apparatus 200, an address inquiry including an incoming number included in the connection request signal, receives a response (address, or information indicating there is no address) from the address resolution apparatus 200, and passes the response to the route determination unit 202.

When the information received from the address inquiry unit 201 is an address, the route determination unit 202 instructs the connection request signal transfer unit 203 to transfer the connection request signal to the address. When the information received from the address inquiry unit 201 is information indicating that "the address does not exist", the route determination unit 202 instructs the connection request signal transfer unit 203 to transfer the connection request signal to the international relay network. The connection request signal transfer unit 203 transfers the connection request signal according to an instruction from the route determination unit 202.

By the way, the function of the route selection apparatus 200 may be implemented in an apparatus for realizing S-CSCF (Serving Call/Session Control Function) of an IMS network in the operator A network, for example. But, the implementation is not limited to this. Also, the route selection apparatus 200 may be realized by one computer (server) or may be realized by a plurality of computers.

Operation Example 1 in the First Embodiment

Figure 7:
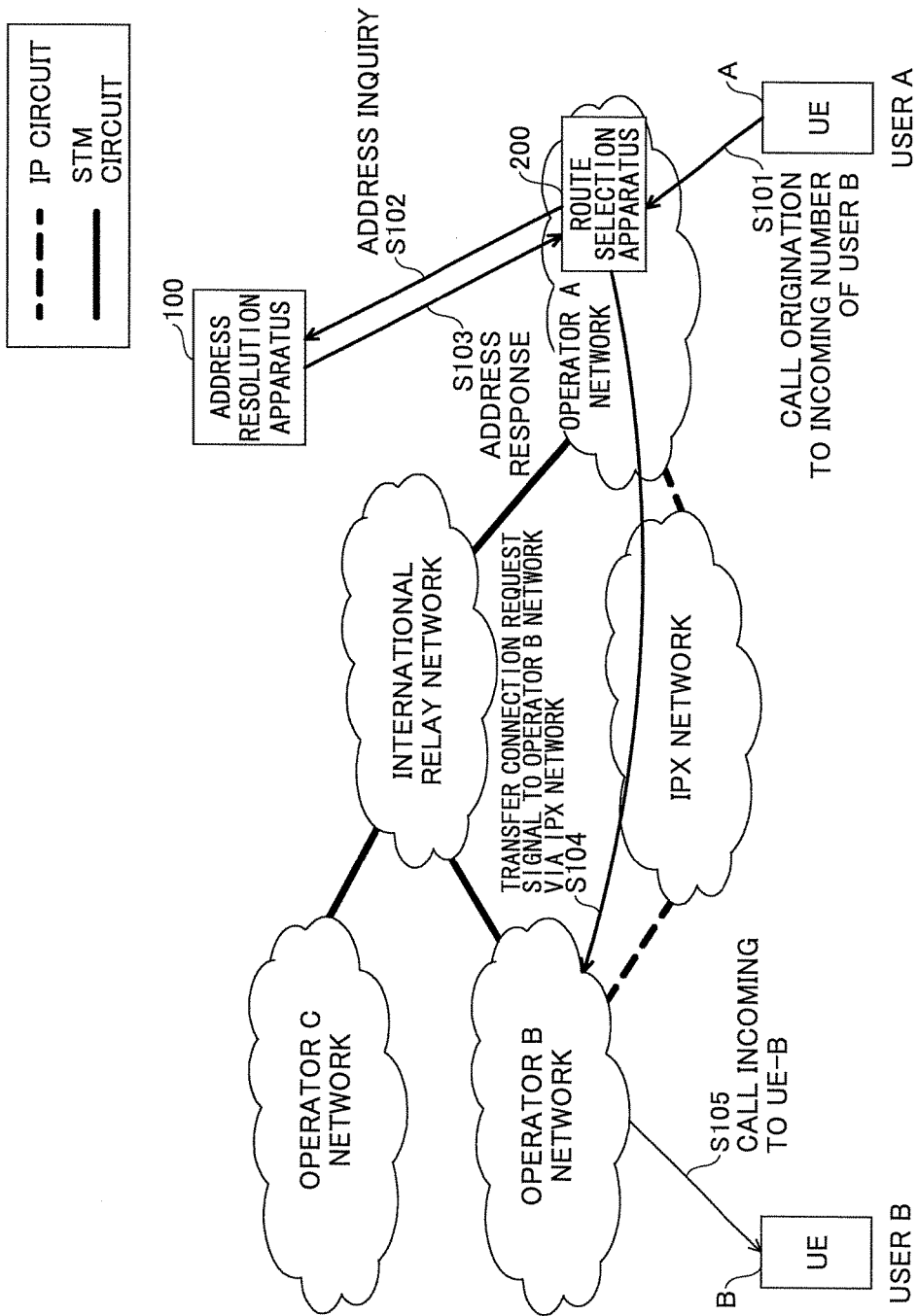
FIG. 7 is a diagram for explaining an operation example 1 in the first embodiment.

Next, an operation example 1 of the system of the first embodiment is described with reference to FIG. 7. The operation example 1 is an example in a case where the user A (UE-A) of the operator A originates a call to the user B (UE-B) of the operator B that is IP-interconnected. Since the operator B network is IP-interconnected with the operator A network, a user B incoming number and an address associated with it are stored in the address resolution apparatus 100.

When the user A performs operation for originating a call to the user B incoming number, a connection request signal including the user B incoming number as a destination is transmitted, so that the route selection apparatus 200 receives the connection request signal (step 101). The route selection apparatus 200 transmits an address inquiry including the user B incoming number to the address resolution apparatus 100 (step 102), and receives a response including an address (operator B network side address) corresponding to the user B incoming number from the address resolution apparatus 100 (step 103).

Next, the route selection apparatus 200 transmits the connection request signal using the address (operator B network side address) obtained in step 103 as a destination (step 104). The connection request signal is transferred to the operator B network via the IPX network, and is transferred to the user B (UE-B) by transfer processing in the operator B network (step 105). After that, a connection response is returned to the UE-A via the same network as that in the connecting process, so that communication such as voice communication and the like is performed between the UE-A and the UE-B.

Operation Example 2 in the First Embodiment

Figure 8:
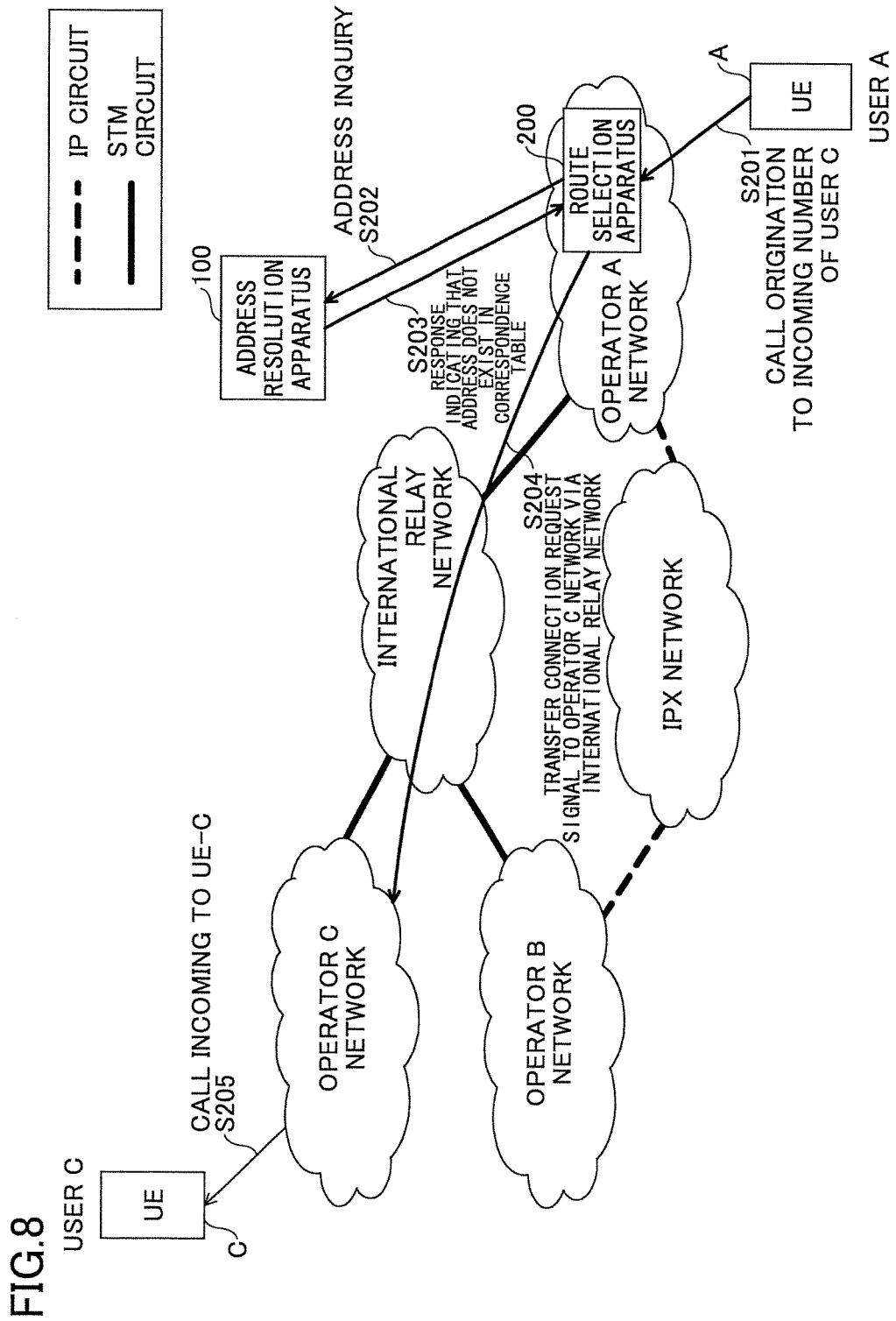
FIG. 8 is a diagram for explaining an operation example 2 in the first embodiment.

Next, an operation example 2 in the first embodiment is described with reference to FIG. 8. The operation example 2 is an example in a case where the user A (UE-A) of the operator A originates a call to the user C (UE-C) of the operator C that is not IP-interconnected. Since the operator C network and the operator A network are not IP-interconnected, the user C incoming number and an address corresponding to it are not stored in the address resolution apparatus 100.

When the user A performs operation for originating a call to the user C incoming number, a connection request signal including the user C incoming number as a destination is transmitted, so that the route selection apparatus 200 receives the connection request signal (step 201). The route selection apparatus 200 transmits an address inquiry including the user C incoming number to the address resolution apparatus 100 (step 202), receives a response, from the address resolution apparatus 100, including information indicating that there is not an address corresponding to the user C incoming number (step 203).

Since the route selection apparatus 200 ascertains that there is no address corresponding to the user C incoming number in step 203, the route selection apparatus 200 transfers the connection request signal from the user A CUE-A) to the international relay network side (step 204). The connection request signal is sent to the operator C network by routing in the international relay network, and is sent to the user C (UE-C) by transfer processing in the operator C network (step 205). After that, a connection response is returned to the UE-A via the same network as that in the connecting process, so that communication such as voice communication and the like is performed between the UE-C and the UE-A.

According to the present embodiment, the route selection apparatus 200 obtains an address corresponding to an incoming number from the address resolution apparatus 100 so as to transfer the connection request signal according to the address, and also, when the route selection apparatus 200 receives information, from the address resolution apparatus 100, indicating that there is no address corresponding to the incoming number, the route selection apparatus 200 transfers the connection request signal to the international relay network. Thus, it becomes possible to solve the problem in that a difference of providing services occurs between an MNP user and an original user, and the problem in that IP interconnection is provided between operator networks that are not IP-interconnected.

As described above, in the present embodiment, there is provided a communication system in which a plurality of communication networks are interconnected, the communication system including a plurality of inter-communication network connections that include an inter-communication network connection by a first circuit performing communication by a first protocol and an inter-communication network connection by a second circuit performing communication by a second protocol, including:

a route selection apparatus that is provided in a communication network that is connected to another communication network by the first circuit, and that is connected to another communication network by the second circuit; and an address resolution apparatus that can communicate with the route selection apparatus, wherein the route selection apparatus sends an inquiry to the address resolution apparatus about an address corresponding to an incoming number in a connection request signal transmitted from a user apparatus in the communication network so as to determine whether to transmit the connection request signal to a communication network of an incoming destination via the first circuit or to transmit the connection request signal to a communication network of an incoming destination via the second circuit based on a response received from the address resolution apparatus.

According to the above configuration, there is provided, in a communication system in which a plurality of communication networks are interconnected, a technique to enable proper communication connection between user apparatuses even when there are a plurality of inter-communication network connections including an inter-communication network connection by a first circuit that performs communication by a first protocol and an inter-communication network connection by a second circuit that performs communication by a second protocol.

For example, when the route selection apparatus can obtain the address corresponding to the incoming number from the address resolution apparatus as a result of the inquiry, the route selection apparatus transmits the connection request signal to a communication network of an incoming destination via the first circuit, and when the route selection apparatus cannot obtain an address corresponding to the incoming number from the address resolution apparatus, the route selection apparatus transmits the connection request signal to a communication network of an incoming destination via the second circuit. According to this configuration, based on a telephone number and an address registered in the address resolution apparatus, it can be properly determined whether to transmit the connection request signal to a communication network of an incoming destination via the first circuit or to transmit the connection request signal to a communication network of an incoming destination via the second circuit.

The address resolution apparatus may include storage means configured to store a telephone number and an address of a user apparatus in another communication network that is connected with the communication network, by the first circuit, that is provided with the route selection apparatus. According to this configuration, an address in another communication network that is connected by the first circuit can be obtained from the address resolution apparatus, so that it becomes possible to connect to the other communication network that is connected by the first circuit by transmitting a connection request signal to the address.

The address resolution apparatus may not store, with an address of another communication network, a telephone number of a user apparatus that is moved out by MNP from a carrier of the other communication network that is connected with the communication network by the first circuit. By adopting such a configuration, it can be avoided to perform connection, via the first circuit, to a user apparatus that is MNP-moved out to a carrier connected by the second circuit.

The address resolution apparatus may store, with an address of another second communication network, a telephone number of a user apparatus that is moved, by MNP, into a carrier of the other second communication network that is connected with the communication network by the first circuit from another first communication network connected with the communication network by the second circuit. By adopting such a configuration, it becomes possible to perform connection, via the first circuit, to a user apparatus that is MNP-moved in from a carrier connected by the second circuit.

For example, the first circuit is an IP circuit, and the second circuit is a digital circuit. According to this configuration, before-explained problems can be resolved in a case where inter-communication network connections of IP circuits and STM circuits coexist.

Also, according to the present embodiment, there is provided a route selection apparatus in a communication system in which a plurality of communication networks are interconnected, the communication system including a plurality of inter-communication network connections that include an inter-communication network connection by a first circuit performing communication by a first protocol and an inter-communication network connection by a second circuit performing communication by a second protocol, the route selection apparatus being provided in a communication network that is connected to another communication network by the first circuit, and that is connected to another communication network by the second circuit, the route selection apparatus including:

means configured to send an inquiry, to an address resolution apparatus that can communicate with the route selection apparatus, about an address corresponding to an incoming number in a connection request signal transmitted from a user apparatus in the communication network; and determination means configured to determine whether to transmit the connection request signal to a communication network of an incoming destination via the first circuit or to transmit the connection request signal to a communication network of an incoming destination via the second circuit based on a response received from the address resolution apparatus.

According to the above configuration, there is provided, in a communication system in which a plurality of communication networks are interconnected, a technique to enable proper communication connection between user apparatuses even when there are a plurality of inter-communication network connections including an inter-communication network connection by a first circuit that performs communication by a first protocol and an inter-communication network connection by a second circuit that performs communication by a second protocol.

Second Embodiment

<System Configuration>

Figure 9:
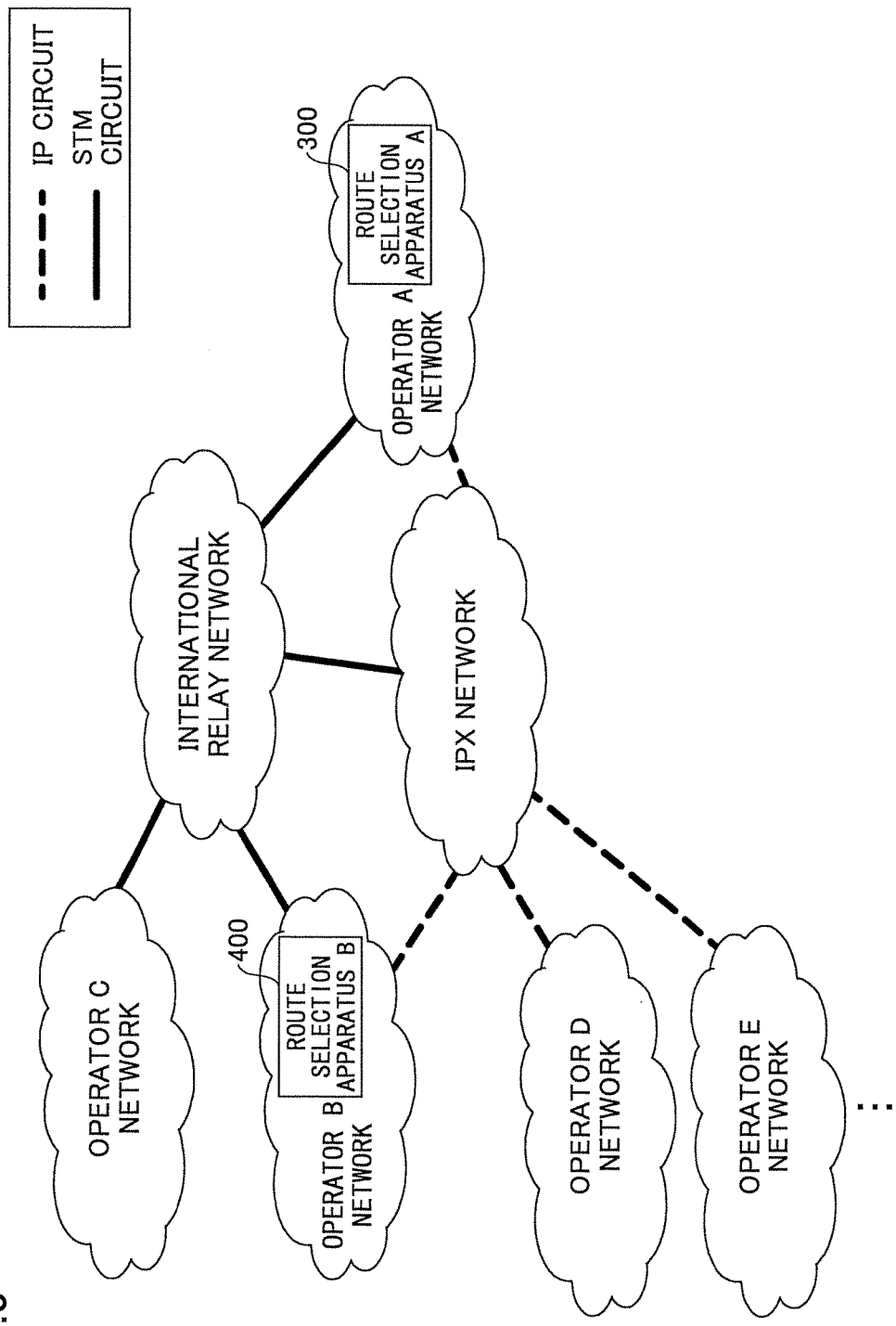
FIG. 9 is a diagram showing a network configuration example in a second embodiment.

Next, a second embodiment of the present invention is described. FIG. 9 is a diagram for explaining a network configuration (system configuration) example of international interconnection in the second embodiment. The network configuration shown here is the same as that shown in FIG. 2 and the like as a connection configuration between operator networks. That is, the operator B network and the operator A network are interconnected by IP circuits via the IPX network, and the operator C network and the operator A network are interconnected by STM circuits via the international relay network. Also, in the example shown in FIG. 9, in addition to the operator B network, an operator D network and an operator E network are shown as networks that are IP-interconnected with the operator A network. Although not shown in the figure, each of the operator D network and the operator E network is also connected to the international relay network via the STM circuit.

Each of the operator networks that are IP-interconnected is provided with a route selection apparatus that is configured to direct a connection request signal and the like to a proper route. FIG. 9 especially shows a route selection apparatus A300 provided in the operator A network, and a route selection apparatus B400 provided in the operator B network. Each operator network (operator D network, E network, . . . ) that is IP-interconnected with the operator A network is provided with a route selection apparatus D400, E400, . . . having the similar function of the route selection apparatus B400 provided in the operator B network.

As described in detail later, in the present embodiment, when the route selection apparatus A300 receives a connection request signal including an incoming number as a destination toward a foreign country (example: Japan) from a user (UE) of the operator A, the route selection apparatus A300 tries IP connection to each operator network that is IP-interconnected with the operator A network in the country, and when all trials are NG, the route selection apparatus A300 performs operation for connecting to the international relay network. Of course, when there is only one operator network that is IP-interconnected with the operator A network in the country, the route selection apparatus A300 tries IP connection only to the specific operator network.

Figure 10:
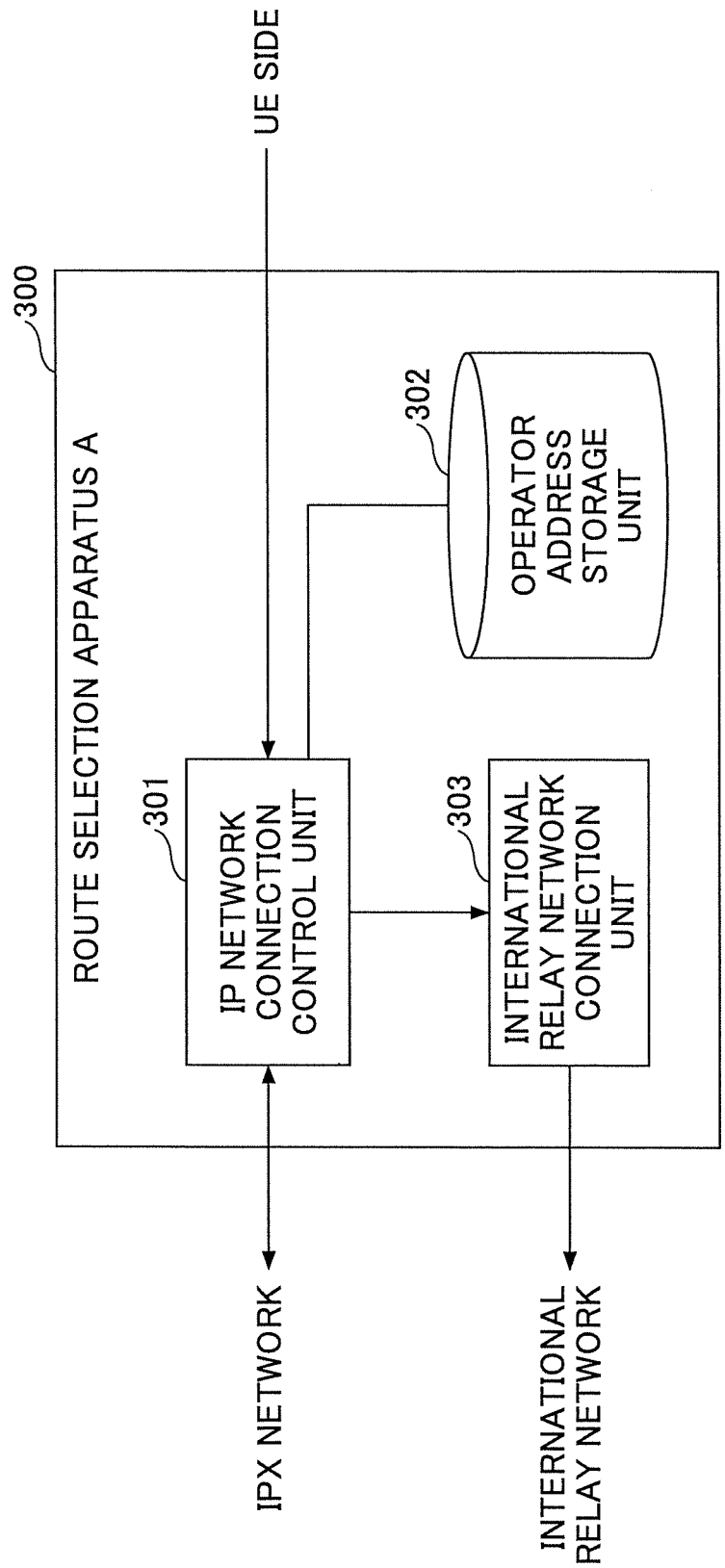
FIG. 10 is a functional block diagram of a route selection apparatus A300.

FIG. 10 shows a functional block diagram of the route selection apparatus A300 in the present embodiment. As shown in FIG. 10, the route selection apparatus A300 includes an IP network connection control unit 301, an operator address storage unit 302, and an international relay network connection unit 303.

FIG. 10 only shows functional units especially related to the embodiment of the present invention in the route selection apparatus A300, and also includes functions that is not shown in the figure for performing actual operations. Also, the functional configuration shown in FIG. 10 is merely an example. Any functional partitions and any names of functional units may be adopted as long as operation of the present embodiment can be executed.

The operator address storage unit 302 in the route selection apparatus A300 shown in FIG. 10 stores addresses of each operator network of each country that is IP-interconnected with the operator A. The "address of the operator network" may be any address as long as when a signal in which the address is specified as a destination is transmitted, the signal arrives at an apparatus in the operator network via the IPX network.

The IP network connection control unit 301 receives a connection request signal originated from a user (UE), then, when an incoming number included in the connection request signal is a number for the foreign country, the IP network connection control unit 301 repeats an operation until connection succeeds, in which, in the operation, the IP network connection control unit 301 obtains an address of the operator network of the country from the operator address storage unit 302, transmits the connection request signal using the obtained address as a destination, then, when receiving "a signal indicating that the UE of the destination of the connection request signal is not a UE of the operator network" (to be referred to as "connection failure signal" hereinafter), obtains an address of a next operator network from the operator address storage unit 302, and transmits a connection request signal using the obtained address as a destination. When there are a plurality of operator networks for trying IP connection, the order of trials may be determined beforehand so as to perform the trials in the order, or, for example, trials may be performed in an order of entries of the database.

As a result of this repeat, when receiving a connection failure signal from all operator networks of the country stored in the operator address storage unit 302, the IP network connection control unit 301 determines to transmit the connection control signal to the international relay network to instruct the international relay network connection unit 303 to transmit the connection request signal to the international relay network. The international relay network connection unit 303 that receives the instruction transmits the connection request signal toward the international relay network.

The function of the route selection apparatus A300 may be implemented in an apparatus that realizes the S-CSCF (Serving Call/Session Control Function) in the IMS network in the operator A network, but, the implementation is not limited to this. Also, the route selection apparatus A300 may be realized by one computer (server) or may be realized by a plurality of computers.

Figure 11:
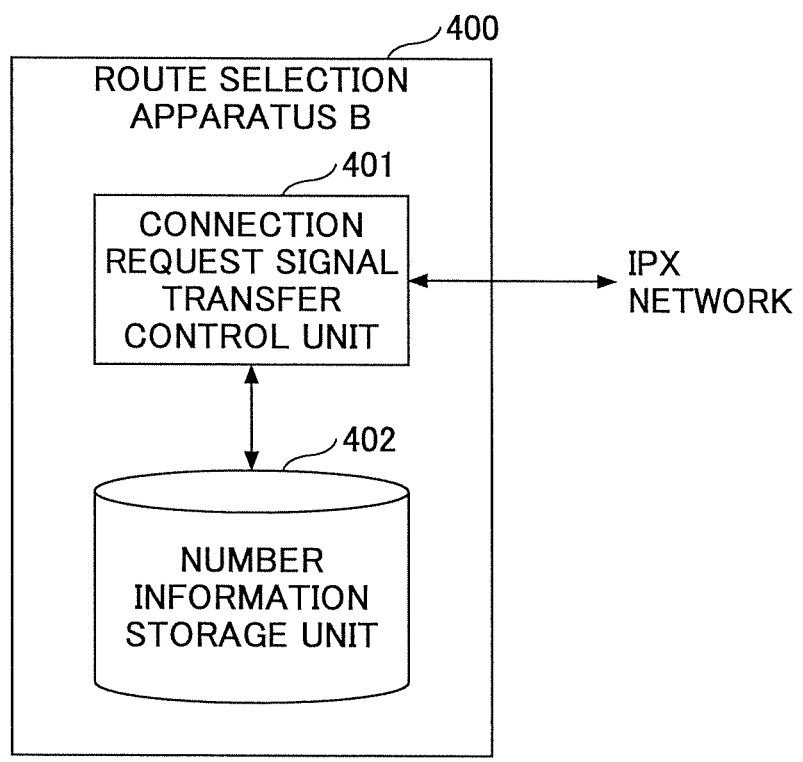
FIG. 11 is a functional block diagram of a route selection apparatus B400.

FIG. 11 shows a functional block diagram of the route selection apparatus B400 of the present embodiment. As shown in FIG. 11, the route selection apparatus B400 includes a connection request signal transfer control unit 401 and a number information storage unit 402.

FIG. 11 only shows functional units especially related to the embodiment of the present invention in the route selection apparatus B400, and also includes functions that is not shown in the figure for performing actual operations. Also, the functional configuration shown in FIG. 11 is merely an example. Any functional partitions and any names of functional units may be adopted as long as operation of the present embodiment can be executed. Also, the route selection apparatus B400 may be referred to as a connection determination apparatus since the route selection apparatus B400 is an apparatus for determining whether to perform connection in the own network.

The number information storage unit 402 in the route selection apparatus B400 shown in FIG. 11 stores telephone numbers of users of the operator B. The telephone numbers do not include a telephone number of a user who moved out by MNP. Or, although it stores a telephone number of a user who moved out by MNP, information indicating that the telephone number is moved out by MNP (that it is not a user of the operator B) is stored for the telephone number.

When the connection request signal transfer control unit 401 receives a connection request signal from an operator network of a foreign country via the IPX network, the connection request signal transfer control unit 401 compares the incoming number of the connection request signal and a telephone number stored in the number information storage unit 402. When the incoming number is stored in the number information storage unit 402, the connection request signal transfer control unit 401 determines that the connection request signal is an incoming signal to a user (UE) of the own network (operator network B) to perform transferring process to the UE. On the other hand, when the incoming number of the connection request signal received from the operator network of the foreign country via the IPX network is not stored in the number information storage unit 402 (or information indicating that the incoming number is not a number of the own network is stored), the connection request signal transfer control unit 401 determines that the connection request signal is not an incoming signal to a user (UE) of the own network (operator B network) to perform operation for returning the connection failure signal to an operator network of a transfer source of the connection request signal. As a connection failure signal, for example, SIP3xx (redirection) signal can be used, but, it is not limited to this. When the SIP redirection signal is used, a concrete redirect destination (other IP connection operator network, international relay network and the like) may be included in the SIP redirection signal, or the concrete redirection destination may not be included. By using the SIP redirection signal, the route selection apparatus A300 can determine that it is necessary to transmit (redirect) the connection request signal to another destination as SIP processing.

By the way, the function of the route selection apparatus B400 may be implemented in an apparatus for realizing S-CSCF (Serving Call/Session Control Function) of an IMS network in the operator B network, for example. But, the implementation is not limited to this. Also, the route selection apparatus B400 may be realized by one computer (server) or may be realized by a plurality of computers.

Operation Example 1 in the Second Embodiment

Figure 12:
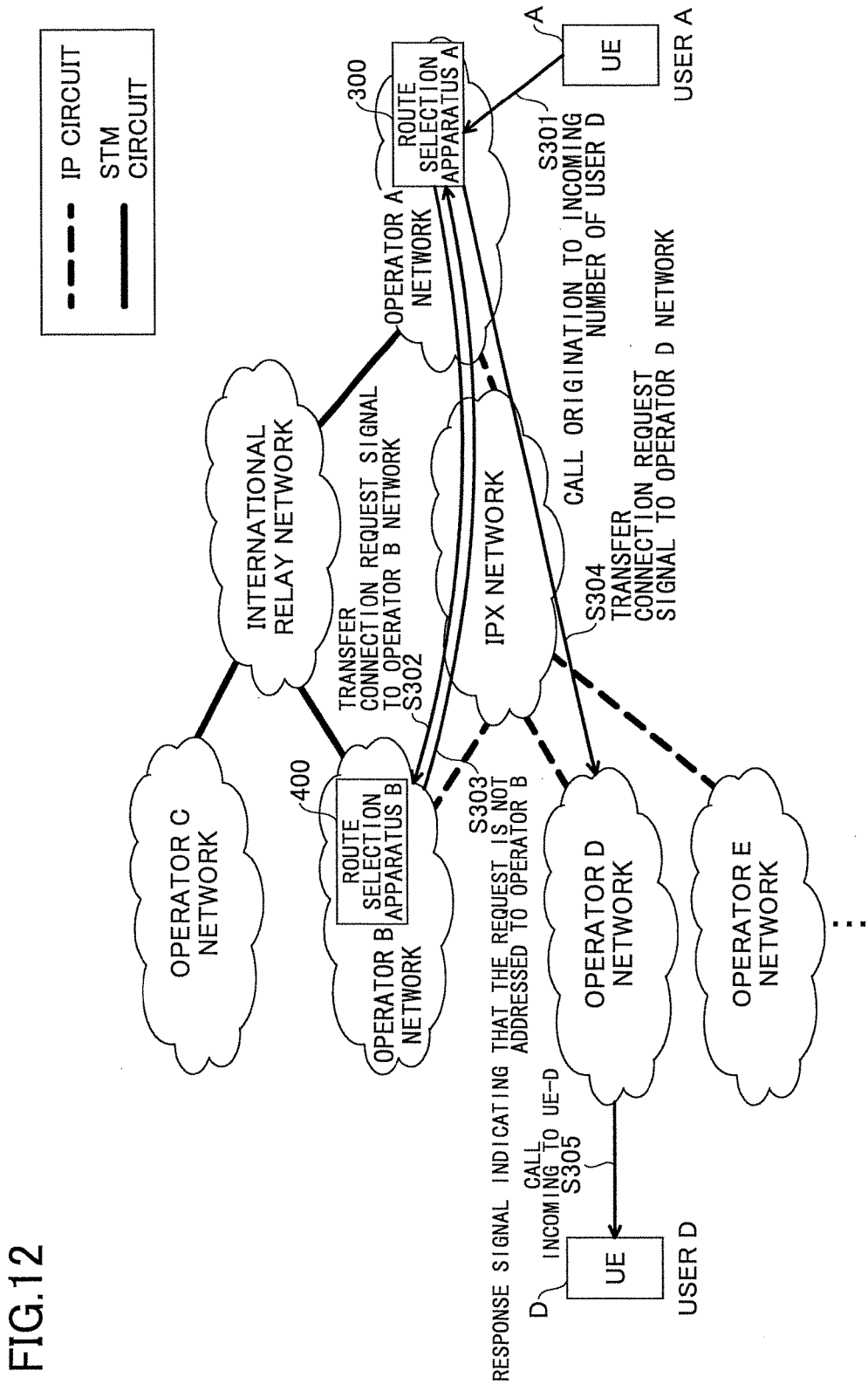
FIG. 12 is a diagram for explaining an operation example 1 in the second embodiment.

Next, an operation example 1 of the system in the second embodiment is described with reference to FIG. 12. The operation example 1 is an example in a case where a user A (UE-A) of the operator A originates a call toward a user D (UE-D) of the operator D that is IP-interconnected.

When the user A performs operation for originating a call to a user D incoming number (including a country identification number) at the UE-A, a connection request signal including the user D incoming number as a destination is transmitted, and the route selection apparatus A300 receives the connection request signal (step 301).

First, the route selection apparatus A300 transfers the connection request signal to the operator B network as an operator network that is IP-interconnected in the country corresponding to the country identification number (step 302). The route selection apparatus B400 in the operator B network receives the connection request signal. But, the route selection apparatus 3400 determines that the incoming number in the connection request signal is not a number of the own network to return a connection failure signal to the route selection apparatus A300 of the operator A network (step 303).

The route selection apparatus A300 transfers the connection request signal toward the operator D network as a next operator network that is IP-interconnected (step 304). The route selection apparatus D400 in the operator D network determines that the incoming number is a number of the own network and transfers the connection request signal to the UE-D, so that the connection request signal is delivered to the UE-D (step 305). After that, a connection response is returned to the UE-A via the same network as that in the connection success, so that communication such as voice communication and the like is performed between the UE-D and the UE-A.

Operation Example 2 in the Second Embodiment

Figure 13:
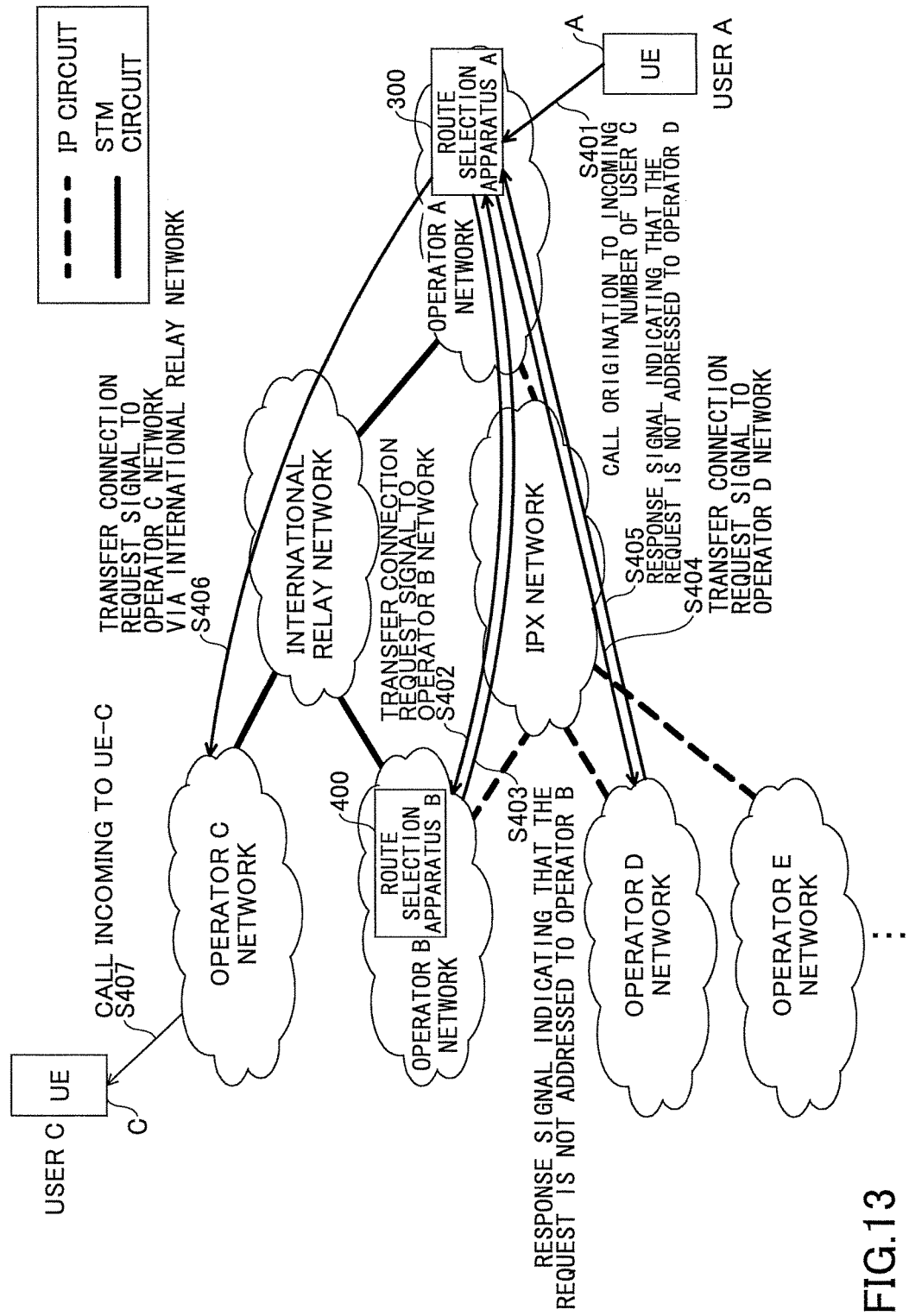
FIG. 13 is a diagram for explaining an operation example 2 in the second embodiment.

Next, an operation example 2 of the system in the second embodiment is described with reference to FIG. 13. The operation example 2 is an example in a case where the user A (UE-A) of the operator A originates a call toward the user C (UE-C) of the operator C that is not IP-interconnected.

When the user A performs operation for originating a call to a user C incoming number (including a country identification number) at the UE-A, a connection request signal including the user C incoming number as a destination is transmitted, and the route selection apparatus A300 receives the connection request signal (step 401).

First, the route selection apparatus A300 transfers the connection request signal to the operator B network as an operator network that is IP-interconnected in the country corresponding to the country identification number (step 402). The route selection apparatus B400 in the operator B network receives the connection request signal. But, the route selection apparatus B400 determines that the incoming number in the connection request signal is not a number of the own network to return a connection failure signal to the route selection apparatus A300 of the operator A network (step 403).

The route selection apparatus A300 transfers the connection request signal toward the operator D network as a next operator network that is IP-interconnected (step 404). The route selection apparatus D400 in the operator D network receives the connection request signal. But, the route selection apparatus D400 determines that the incoming number in the connection request signal is not a number of the own network to return a connection failure signal to the route selection apparatus A300 of the operator A network (step 405).

The route selection apparatus A300 tries IP connection to every operator network that is IP-interconnected in the country in the same way as that mentioned above. However, in every case, the connection failure signal is returned. After the last connection failure signal is returned (if there is only one trial operator network, after the first connection failure signal is returned), the route selection apparatus A300 transmits the connection request signal to the international relay network, so that the connection request signal is delivered to the operator C network via the international relay network (step 406). Then, the connection request signal is delivered to the user C (UE-C) by transfer processing in the operator C network (step 407). After that, a connection response is returned to the UE-A via the same network as that in the connecting process, so that communication such as voice communication and the like is performed between the UE-C and the UE-A.

According to the present embodiment, the route selection apparatus A300 tries IP connection to an operator network that is IP-interconnected. In the route selection apparatus B400 and the like of the operator network that receives the connection request signal of the trial, when the number is not an incoming number to the own network, the connection failure signal is returned to the route selection apparatus A300. In a case where connection does not succeed even though the route selection apparatus A300 tries IP connection to every operator network that is IP-interconnected, connection to the international relay network is performed. Therefore, it becomes possible to solve the problem in that a difference of providing services occurs between an MNP user and an original user, and the problem in that IP interconnection is provided between operator networks that are not IP-interconnected.

As described above, according to the present embodiment, there is provided a communication system in which a plurality of communication networks are interconnected, the communication system including a plurality of inter-communication network connections that include an inter-communication network connection by a first circuit performing communication by a first protocol and an inter-communication network connection by a second circuit performing communication by a second protocol, including:

a route selection apparatus that is provided in a communication network that is connected to another communication network by the first circuit, and that is connected to another communication network by the second circuit; and a connection determination apparatus that is provided in a first circuit connection network that is the other communication network connected with the communication network by the first circuit, wherein, when the route selection apparatus receives a connection request signal transmitted from a user apparatus in the communication network, the route selection apparatus transmits the connection request signal to the first circuit connection network, and wherein, when the route selection apparatus receives a connection failure signal, from the connection determination apparatus, indicating that an incoming destination of the connection request signal is not a user apparatus of the first circuit connection network, the route selection apparatus transmits the connection request signal to a communication network of an incoming destination via the second circuit.

According to the above configuration, there is provided, in a communication system in which a plurality of communication networks are interconnected, a technique to enable proper communication connection between user apparatuses even when there are a plurality of inter-communication network connections including an inter-communication network connection by a first circuit that performs communication by a first protocol and an inter-communication network connection by a second circuit that performs communication by a second protocol.

In a case where there are a plurality of first circuit connection networks each being the other communication network connected with the communication network by the first circuit, the route selection apparatus may transmit the connection request signal to each of the plurality of first circuit connection networks, and wherein, when the route selection apparatus receives a connection failure signal from each connection determination apparatus in the plurality of first circuit connection networks, the route selection apparatus may transmit the connection request signal to a communication network of an incoming destination via the second circuit. According to this configuration, even when there are a plurality of first circuit connection network each being connected with the communication network by the first circuit, it is possible to properly determine to transmit the connection request signal to a communication network of an incoming destination via the second circuit.

The route selection apparatus may transmit the connection request signal to each first circuit connection network in a predetermined order in the plurality of first circuit connection network. According to this configuration, for example, it becomes possible to quickly perform connection to a connection destination of high priority.

When the connection determination apparatus determines that an incoming number in the connection request signal received from the route selection apparatus is not a telephone number of a user apparatus in a communication network in which the connection determination apparatus is provided, the connection determination apparatus may return the connection failure signal to the route selection apparatus that is a transmission source of the connection request signal. According to this configuration, the connection determination apparatus can properly determine whether to return the connection failure signal.

For example, the first circuit is an IP circuit, and the second circuit is a digital circuit. According to this configuration, before-explained concrete problems can be resolved in a case where inter-communication network connections of IP circuits and STM circuits coexist.

For example, the connection failure signal is a SIP redirection signal. According to this configuration, the route selection apparatus that receives the connection failure signal can determine, in SIP processing, to transmit the connection request signal to another destination.

Also, according to the present embodiment, there is provided a route selection apparatus in a communication system in which a plurality of communication networks are interconnected, the communication system including a plurality of inter-communication network connections that include an inter-communication network connection by a first circuit performing communication by a first protocol and an inter-communication network connection by a second circuit performing communication by a second protocol, and the route selection apparatus being provided in a communication network that is connected to another communication network by the first circuit, and that is connected to another communication network by the second circuit, wherein a connection determination apparatus is provided in a first circuit connection network that is the other communication network connected with the communication network by the first circuit, the route selection apparatus including:

transmission means configured, when receiving a connection request signal transmitted from a user apparatus in the communication network, to transmit the connection request signal to the first circuit connection network, and connection control means configured, when receiving a connection failure signal, from the connection determination apparatus, indicating that an incoming destination of the connection request signal is not a user apparatus of the first circuit connection network, to transmit the connection request signal to a communication network of an incoming destination via the second circuit.

According to the above configuration, there is provided, in a communication system in which a plurality of communication networks are interconnected, a technique to enable proper communication connection between user apparatuses even when there are a plurality of inter-communication network connections including an inter-communication network connection by a first circuit that performs communication by a first protocol and an inter-communication network connection by a second circuit that performs communication by a second protocol.

Other Embodiment

In the above, although the first embodiment and the second embodiment have been explained separately, these can be carries out by combining them. That is, the route selection apparatus provided in each operator network may be provided with both of the function in the first embodiment and the function in the second embodiment.

Also, for example, in a case where there is no user of an incoming number in a connection destination operator network due to some sort of inexpedience although connection via the IPX network is performed according to an address received from the address resolution apparatus 100 described in the first embodiment, a connection failure signal is returned to the trial source like the second embodiment, and after that, in the same way as the second embodiment, operation of trial of IP connection is repeated if there is another operator network of IP connection candidate, and if there is no operator network of IP connection candidate, connection may be performed via the international relay network.

Each of the address resolution apparatus and the route selection apparatuses described in the present embodiments may include a CPU and a memory and may be realized by executing a program by the CPU (processor), or may be realized by hardware such as hardware circuits including logics of processing described in the present embodiments, or may be configured by coexistence of a program and hardware. Also, the program may be distributed via a network, and may be distributed by recording the program in a recording medium such as a potable memory and the like.

In the above, the present invention has been explained while referring to the specific embodiments. However, the disclosed invention is not limited to the embodiments. Those skilled in the art will conceive of various modified examples, corrected examples, alternative examples, substituted examples, and the like. While specific numerical value examples are used to facilitate understanding of the present invention, such numerical values are merely examples, and any appropriate value may be used unless specified otherwise. Classification into each item in the description is not essential in the present invention, and features described in two or more items may be combined and used as necessary. Subject matter described in an item may be applied to subject matter described in another item (provided that they do not contradict).

It is not always true that the boundaries of the functional units or the processing units in the functional block diagram correspond to boundaries of physical components. The operations by the plural functional units may be physically performed by a single component. Alternatively, the operations by the single functional unit may be physically performed by plural components.

For convenience of explanation, each apparatus has been explained by using functional block diagrams. However, such an apparatus may be implemented in hardware, software, or a combination thereof.

The software executed by a processor (CPU) provided in each apparatus according to the present embodiments may be stored in any proper storage medium such as a Random Access Memory (RAM), a flash memory, a Read Only Memory (ROM), an EPROM, an EEPROM, a register, a hard disk (HDD), a removable disk, a CD-ROM, a database, a server and the like.

The present invention is not limited to the above-mentioned embodiment and is intended to include various variations, modifications, alterations, substitutions and so on without departing from the spirit of the present invention.

The present patent application claims priority based on Japanese patent application No. 2014-175952, filed in the JPO on Aug. 29, 2014, and the entire contents of the Japanese patent application No. 2014-175952 are incorporated herein by reference.

DESCRIPTION OF REFERENCE SIGNS 100 address resolution apparatus
101 address resolution unit
102 telephone number/address correspondence table storage unit
200 route selection apparatus
201 address inquiry unit
202 route determination unit
203 connection request signal transfer unit
300 route selection apparatus A
301 IP network connection control unit
302 operator address storage unit
303 international relay network connection unit
400 route selection apparatus B
401 connection request signal transfer control unit
402 number information storage unit

The invention claimed is:

1. A communication system comprising:
a route selection apparatus that is provided in a communication network that is connected to another communication network by a first circuit performing communication by a first protocol and that is connected to another communication network by a second circuit performing communication by a second protocol; and
an address resolution apparatus that can communicate with the route selection apparatus,
wherein the route selection apparatus sends an inquiry to the address resolution apparatus about an address corresponding to an incoming number in a connection request signal transmitted from a user apparatus in the communication network so as to determine whether to transmit the connection request signal to a communication network of an incoming destination via the first circuit or to transmit the connection request signal to a communication network of an incoming destination via the second circuit based on a response received from the address resolution apparatus.

2. The communication system as claimed in claim 1, wherein, when the route selection apparatus can obtain the address corresponding to the incoming number from the address resolution apparatus as a result of the inquiry, the route selection apparatus transmits the connection request signal to a communication network of an incoming destination via the first circuit, and
wherein when the route selection apparatus cannot obtain an address corresponding to the incoming number from the address resolution apparatus, the route selection apparatus transmits the connection request signal to a communication network of an incoming destination via the second circuit.

3. The communication system as claimed in claim 1, wherein the address resolution apparatus includes storage unit configured to store a telephone number and an address of a user apparatus in another communication network that is connected with the communication network, by the first circuit, that is provided with the route selection apparatus.

4. The communication system as claimed in claim 3, wherein the address resolution apparatus does not store, with an address of another communication network, a telephone number of a user apparatus that is moved out through Mobile Number Portability (MNP) process from a carrier of the other communication network that is connected with the communication network by the first circuit.

5. The communication system as claimed in claim 3, wherein the address resolution apparatus stores, with an address of another second communication network, a telephone number of a user apparatus that is moved, through MNP process, into a carrier of the other second communication network that is connected with the communication network by the first circuit from another first communication network connected with the communication network by the second circuit.

6. The communication system as claimed in claim 1, wherein the first circuit is an Internet Protocol (IP) circuit, and the second circuit is a digital circuit.

7. The communication system as claimed in claim 2, wherein the address resolution apparatus includes storage unit configured to store a telephone number and an address of a user apparatus in another communication network that is connected with the communication network, by the first circuit, that is provided with the route selection apparatus.

8. The communication system as claimed in claim 4, wherein the address resolution apparatus stores, with an address of another second communication network, a telephone number of a user apparatus that is moved, through MNP process, into a carrier of the other second communication network that is connected with the communication network by the first circuit from another first communication network connected with the communication network by the second circuit.

9. The communication system as claimed in claim 2, wherein the first circuit is an IP circuit, and the second circuit is a digital circuit.

10. The communication system as claimed in claim 3, wherein the first circuit is an IP circuit, and the second circuit is a digital circuit.

11. The communication system as claimed in claim 4, wherein the first circuit is an IP circuit, and the second circuit is a digital circuit.

12. The communication system as claimed in claim 5, wherein the first circuit is an IP circuit, and the second circuit is a digital circuit.

13. A route selection apparatus comprising:
a transceiver that sends an inquiry, to an address resolution apparatus that can communicate with the route selection apparatus, about an address corresponding to an incoming number in a connection request signal transmitted from a user apparatus in a communication network; wherein the communication network is connected to another communication network by a first circuit performing communication by a first protocol and is connected to another communication network by a second circuit performing communication by a second protocol, and
a processor that determines whether to transmit the connection request signal to a communication network of an incoming destination via the first circuit or to transmit the connection request signal to a communication network of an incoming destination via the second circuit based on a response received from the address resolution apparatus.

14. The route selection apparatus as claimed in claim 13, wherein, when the route selection apparatus can obtain the address corresponding to the incoming number from the address resolution apparatus as a result of the inquiry, the determination unit determines to transmit the connection request signal to a communication network of an incoming destination via the first circuit, and wherein when the route selection apparatus cannot obtain the address corresponding to the incoming number from the address resolution apparatus, the determination unit determines to transmit the connection request signal to a communication network of an incoming destination via the second circuit.

15. A route selection method executed by a route selection apparatus in a communication system, the route selection method comprising:

a step of sending an inquiry, to an address resolution apparatus that can communicate with the route selection apparatus, about an address corresponding to an incoming number in a connection request signal transmitted from a user apparatus in a communication network; wherein the communication network is connected to another communication network by a first circuit performing communication by a first protocol and is connected to another communication network by a second circuit performing communication by a second protocol, and a determination step of determining whether to transmit the connection request signal to a communication network of an incoming destination via the first circuit or to transmit the connection request signal to a communication network of an incoming destination via the second circuit based on a response received from the address resolution apparatus.

16. The route selection method as claimed in claim 15, wherein, in the determination step, when the route selection apparatus can obtain the address corresponding to the incoming number from the address resolution apparatus as a result of the inquiry, the route selection apparatus determines to transmit the connection request signal to a communication network of an incoming destination via the first circuit, and wherein when the route selection apparatus cannot obtain the address corresponding to the incoming number from the address resolution apparatus, the route selection apparatus determines to transmit the connection request signal to a communication network of an incoming destination via the second circuit.

* * * * *